US010248466B2

(12) United States Patent
Chan et al.

(10) Patent No.: US 10,248,466 B2
(45) Date of Patent: Apr. 2, 2019

(54) MANAGING WORKLOAD DISTRIBUTION AMONG PROCESSING SYSTEMS BASED ON FIELD PROGRAMMABLE DEVICES

(71) Applicant: INTERNATIONAL BUSINESS MACHINES CORPORATION, Armonk, NY (US)

(72) Inventors: Yuk L. Chan, Rochester, NY (US); Andrew P. Wack, Millbrook, NY (US); Peter B. Yocom, LaGrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 15/271,753

(22) Filed: Sep. 21, 2016

(65) Prior Publication Data

US 2018/0081723 A1 Mar. 22, 2018

(51) Int. Cl.
*G06F 9/48* (2006.01)
*G06F 9/50* (2006.01)

(52) U.S. Cl.
CPC ............ *G06F 9/505* (2013.01); *G06F 9/4881* (2013.01)

(58) Field of Classification Search
None
See application file for complete search history.

(56) References Cited

U.S. PATENT DOCUMENTS

| 7,996,346 B2 | 8/2011 | Bell, Jr. et al. |
| 2011/0161972 A1* | 6/2011 | Dillenberger ......... G06F 9/5044 718/104 |
| 2015/0113268 A1 | 4/2015 | Wu |
| 2016/0323161 A1* | 11/2016 | Cuervo Laffaye .... G06F 9/5044 |
| 2018/0083632 A1 | 3/2018 | Chan et al. |

OTHER PUBLICATIONS

Tsoi, Kuen Hung, et al. "Power Profiling and Optimization for Heterogeneous Multi-Core System," Department of Computing, Imperial College London, Aug. 29, 2011, pp. 1-6.
List of IBM Patents or Patent Applications Treated as Related; Date Filed: Oct. 12, 2016, p. 1-2.

(Continued)

*Primary Examiner* — Sisley N Kim
(74) *Attorney, Agent, or Firm* — Cantor Colburn LLP; William Kinnaman

(57) ABSTRACT

Examples of techniques for managing workload distribution based on field programmable devices are disclosed. In one example implementation according to aspects of the present disclosure, a computer-implemented method may include: determining, by a processor, a first workload performance for a first general purpose processor and a first field programmable device for a first processing system; determining, by the processor, a second workload performance for a second general purpose processor and a second field programmable device for a second processing system; determining whether the first processing system is likely to outperform the second processing system for execution of a workload; and responsive to determining that the first processing system is likely to outperform the second processing system for the workload, deploying the workload to the first processing system.

18 Claims, 4 Drawing Sheets

(56) References Cited

OTHER PUBLICATIONS

Yuk L. Chan, et al.,"Deploying and Utilizing a Software Library and Corresponding Field Programmable Device Binary", U.S. Appl. No. 15/271,789, filed Sep. 21, 2016.
Yuk L. Chan, et al.,"Deploying and Utilizing a Software Library and Corresponding Field Programmable Device Binary", U.S. Appl. No. 15/271,742 , filed Sep. 21, 2016.
Yuk L. Chan, et al.,"Enabling a Field Programmable Device On-Demand", U.S. Appl. No. 15/271,720, filed Sep. 21, 2016.
Yuk L. Chan, et al.,"Reprogramming a Field Programmable Device On-Demand", U.S. Appl. No. 15/271,728, filed Sep. 21, 2016.
Yuk L. Chan, et al.,"Resource Sharing Management of a Field Programmable Device", U.S. Appl. No. 15/271,780, filed Sep. 21, 2016.
Yuk L. Chan, et al.,"Service Level Management of a Workload Defined Environment" U.S. Appl. No. 15/271,770, filed Sep. 21, 2016.
Yuk L. Chan, et al.,"Service Level Management of a Workload Defined Environment", U.S. Appl. No. 15/271,760, filed Sep. 21, 2016.
List of IBM Patents or Patent Applications Treated as Related; Date Filed: Apr. 24, 2017, p. 1-2.

\* cited by examiner

MANAGING WORKLOAD DISTRIBUTION AMONG PROCESSING SYSTEMS BASED ON FIELD PROGRAMMABLE DEVICES

BACKGROUND

The present application generally relates to field programmable devices and, more particularly, to managing workload distribution among processing systems based on field programmable devices.

Special purpose processing units are gaining popularity due to their high performance. In some situations, hardware manufacturers have begun adding field-programmable device-based special purpose processing units to computing systems to improve performance and cost to run a special workload. A field-programmable device (FPD) such as a field programmable gate array (FPGA), a programmable read-only memory (PROM), or a programmable logic device (PLD) provides more flexible compared to traditional integrated circuit manufacturing by allowing updating of functionality after shipping the computing system (i.e., while the computing system is in the field). The update of the functionality of an FPD is currently limited to firmware upgrades, service related tasks, or a human decision to re-purpose an FPD.

SUMMARY

According to examples of the present disclosure, techniques including methods, systems, and/or computer program products for managing workload distribution based on field programmable devices are provided. An example method may include: determining, by a processor, a first workload performance for a first general purpose processor and a first field programmable device for a first processing system; determining, by the processor, a second workload performance for a second general purpose processor and a second field programmable device for a second processing system; determining whether the first processing system is likely to outperform the second processing system for execution of a workload; and responsive to determining that the first processing system is likely to outperform the second processing system for the workload, deploying the workload to the first processing system.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

The present techniques provide for managing workload distribution among processing systems based on field programmable devices. Current approaches for workload distribution management do not account for the load on the general purpose processor and the load on special purposes devices, such as field programmable devices. The present workload distribution techniques apply to load balancer based workload distribution, virtual servers, and/or container allocation decision and migration management, collectively referred to herein as workloads.

In some implementations, the present techniques include or yield various technical features, technical effects, and/or improvements to technology. For instance, examples of the present disclosure provide the technical effect of managing workloads among multiple processing systems based on both general purpose processors and special purposes devices, such as field programmable devices. This technical effect is achieved as a result of the technical features of determining workload performance for processing systems and determining which processing system is more likely to perform better for a workload. This ensures that the most efficient processing system is selected for executing a workload and thus improves the functioning of the processing system by efficiently utilizing processing and memory resources. As a result of these technical features and technical effects, example embodiments of the disclosure constitute an improvement to existing computing resource management technology. It should be appreciated that the above examples of technical features, technical effects, and improvements to the technology of example embodiments of the disclosure are merely illustrative and not exhaustive. These and other advantages will be apparent from the description that follows.

Figure 1:
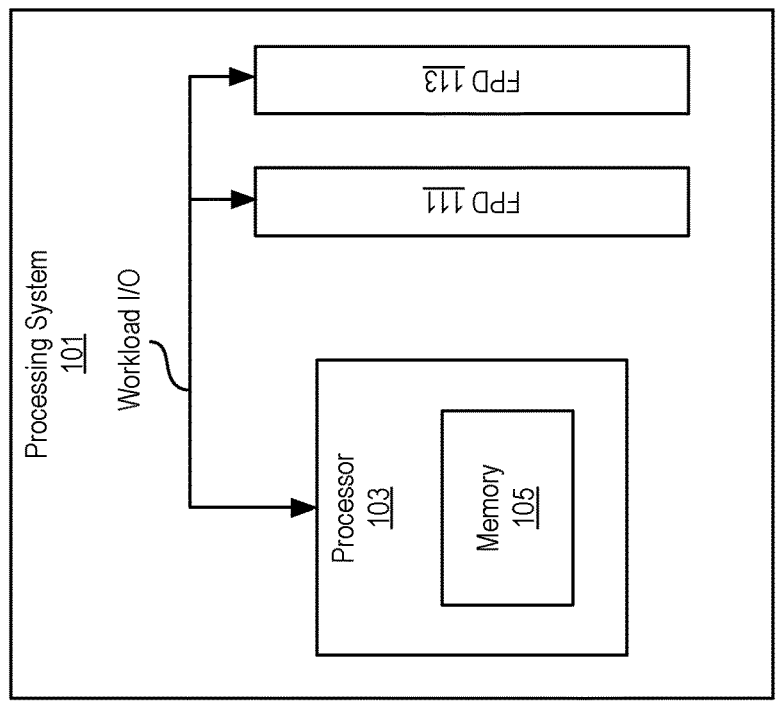
FIG. 1 illustrates a block diagram of processing systems comprising field programmable devices according to examples of the present disclosure.
Figure 1:
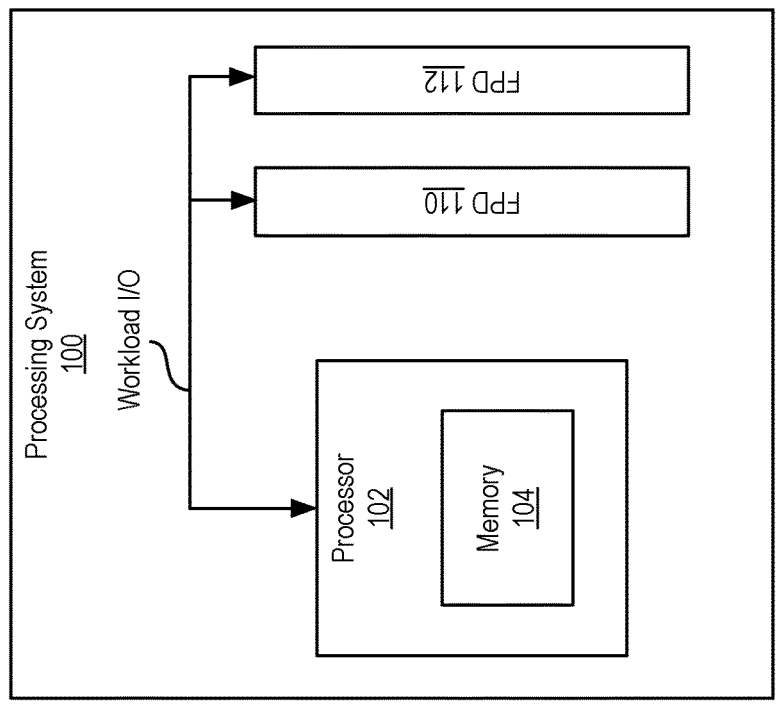

FIG. 1 illustrates a block diagram of processing systems 100, 101 comprising field programmable devices 110, 111, 112, 113 according to examples of the present disclosure. In particular, the processing system 100 includes a processor 102 that may be a general purpose processor and a memory 104 associated with the processor 102. The processor 102 is responsible for executing computer readable instructions stored in the memory 104. For example, the processor 102 may execute an operating system and one or more applications running within the operating system.

Similarly, the processing system 101 includes a processor 103 that may be a general purpose processor and a memory 105 associated with the processor 103. The processor 103 is responsible for executing computer readable instructions stored in the memory 105. For example, the processor 103 may execute an operating system and one or more applications running within the operating system.

In some situations, specialized tasks may be offloaded onto an FPD. The FPD may execute computer readable instructions (i.e., logic) to perform a specialized task, such as encoding/decoding of data, data encryption, data analytics, or other tasks that are suitable for execution on a field programmable device. By offloading these specialized tasks to FPDs, the processing system 100 and its processor 102 is free to perform other tasks.

In the example of FIG. 1, the processing system 100 includes two FPDs (e.g., FPD 110 and FPD 112). Similarly, the processing system 101 includes two FPDs (e.g., FPD 111 and FPD 113). It should be appreciated that other numbers of FPDs are possible and that each of the processing systems may have differing numbers of FPDs.

The present techniques provide for managing workload distribution among the processing systems 100, 101 based on the respective FPDs 110, 112 and FPD 111, 113. Generally, as described in more detail herein, the present techniques include determining workload performance of multiple processing systems (e.g., processing systems 100, 101) and determining whether one of the processing systems is more likely to perform better for a workload. The workload is then deployed to whichever processing system is mole likely to perform better for the workload.

In one example, a response time for a transaction in processing system 100 is projected by taking into account a delay of the processor 102 and a queue time of the FPDs 110, 112). The delay and queue time projected for the processing system 100 is compared to a performance objective, such as may be specified in a service level agreement (SLA). For example, if the transaction is specified in the SLA to execute in a certain amount of time, but the delay of processor 102 and the queue time of the FPDs 110, 112 cannot satisfy the specified time, the processing system 100 is not suitable for the transaction. It should be appreciated that the workload management decision may be based on various factors, including workload priority, response time, or velocity goals specified in the SLA, for example.

In another example, a response time for the transaction in processing system 101 is also projected by taking into account a delay of processor 103 and a queue time of the FPDs 111, 113). The delay and queue time projected for the processing system 100 is compared to the delay and queue time projected for the processing system 101. The workload may be deployed on the processing system with the lower combined delay and queue time.

In another non-limiting example, a bottleneck can be caused by either the FPD or the general purpose processor. For example, a web based image processing application might use a Web Server and Application Server that are running on one or more general processors, and using one or more FPDs for one or more image processing tasks. The response time to the user using the web based image processing application can be limited at the Web Server and Application Server when the general processors are 100% utilized, while the one or more FPDs are not 100% utilized. The response time to the user using the web based image processing application can be also be limited at the one or more FPDs that are 100% utilized, while the Web Server and Application Server running on the general processors are not fully utilized.

In another non-limiting example, a potential bottleneck can be estimated based on the current utilization of the general purpose processors and the FPDs. In a similar example as above, if the Web Server and Application Server are running at 80% utilized and the FPDs are running at 60% utilized, it is possible to project that when the Web Server and Application Server are running at 100% on the general purpose processors, the FPDs are likely to be at 75% utilization based on ratio of impact between the general purpose processors and FPDs at 80:60.

Other mechanisms could also be used. For example, it can be estimated that a portion of the Web Server and Application Server utilization (e.g., 70%) are a basic service and does not scale according to the workload demand while the utilization on the FPDs scale according to the workload demand. In this case, the ratio of impact for the general purpose processors and FPDs will be 10:60, and when FPD is at 100% utilization, the general purpose processors will be at 96% utilized, therefore, the FPDs are the bottleneck. Another mechanism can also be used to determine relationship between the FPDs and general purpose processors, when one or both utilization are non-linearly scaled with the workload demand, by plotting the historical utilization of both the FPDs and general purpose processors, and project the utilization of FPDs in relationship to the general purpose processors.

It should be appreciated that the workload management techniques provide load balancing between the processing systems 100, 101. In additional examples, the present techniques apply to the case of processing system 100 using two groups of FPDs, one configured with logic A and another configured with logic B, while the processing system 100 uses only one group of FPDs configured with logic A. The processing systems 100, 101 may then be compared, and the load balancing techniques provide herein may be applied accordingly. It should be appreciated other suitable configuration are also possible. For example, multiple processing systems may be compared, with each of the processing systems having the same or different configurations of FPDs.

Figure 4:
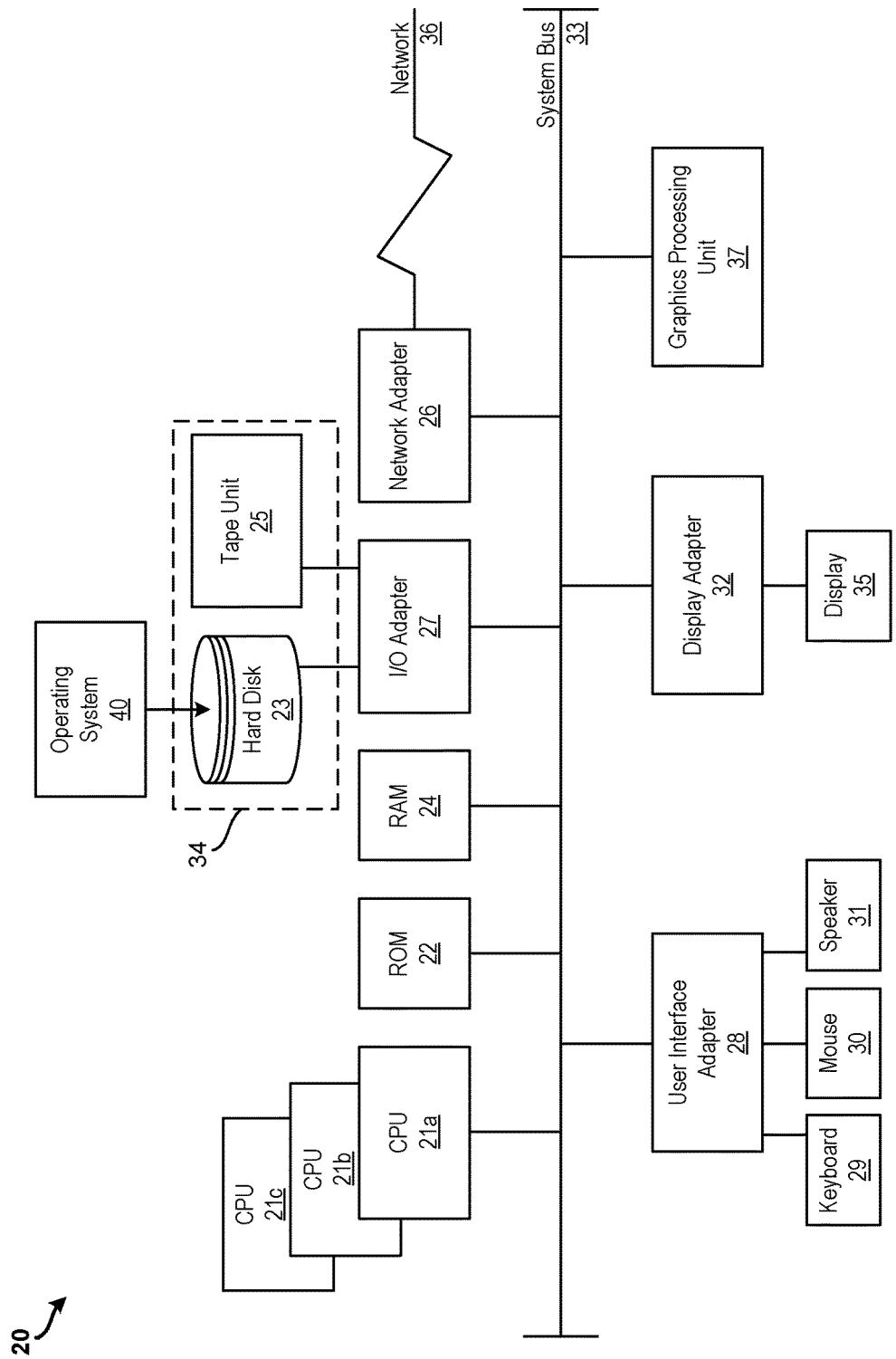
FIG. 4 illustrates a block diagram of a processing system for implementing the techniques described herein according to examples of the present disclosure.

It should also be appreciated that the workload management techniques disclosed herein may be implemented by any suitable processing system, such as the processing systems 100 or 101 of FIG. 1, by the processing system 20 of FIG. 4, or by another suitable processing system. For example, a dedicated load balancing processing system may be implemented to perform the present workload management techniques, or one of the processing systems 100, 101 may be designated to perform the workload management.

Figure 2:
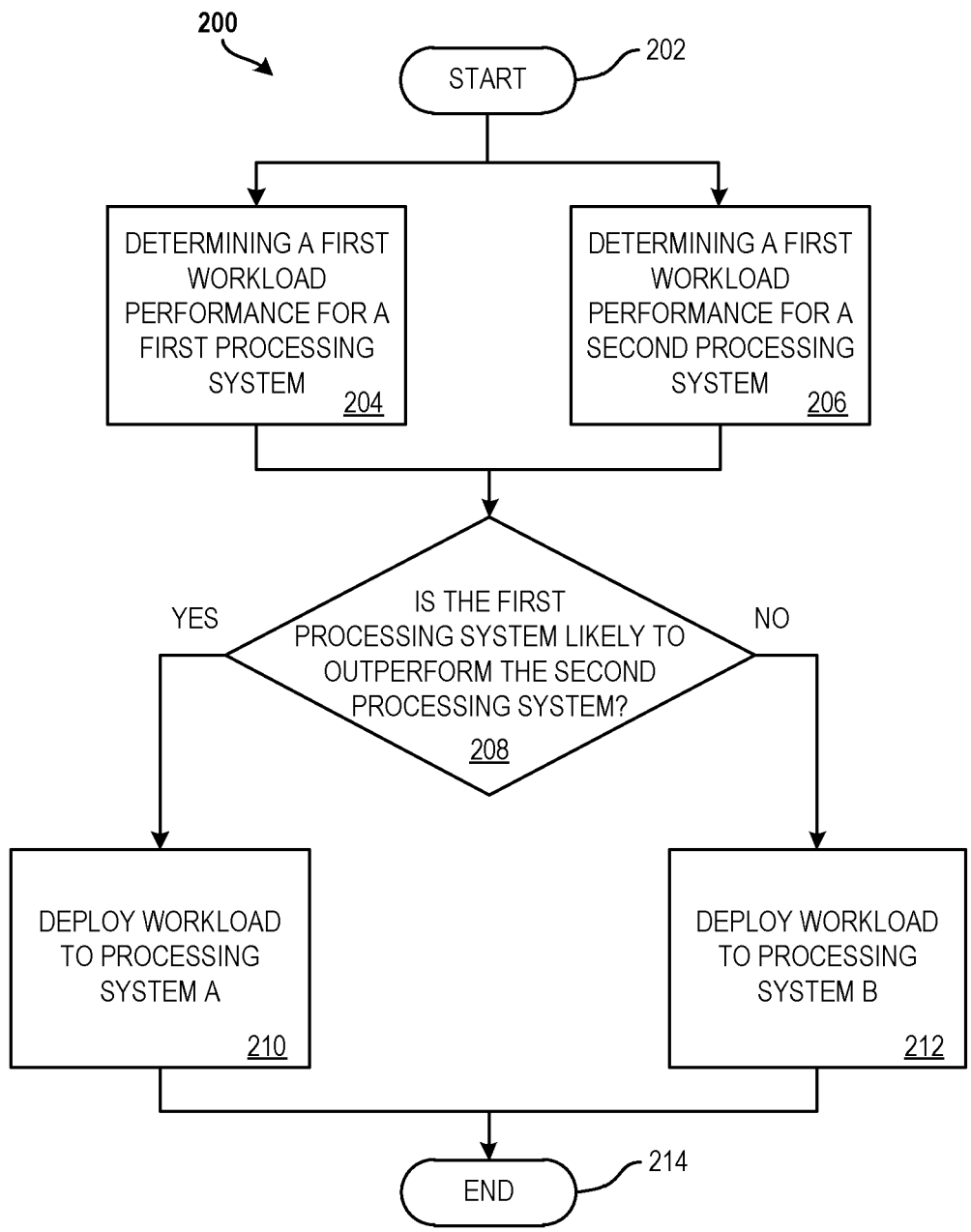
FIG. 2 illustrates a flow diagram of a method for managing workload distribution among processing systems based on field programmable devices according to examples of the present disclosure.

FIG. 2 illustrates a flow diagram of a method 200 for managing workload distribution among processing systems based on field programmable devices according to examples of the present disclosure. The method 200 may be performed, for example, by the processing system 100 and/or the processing system 101 of FIG. 1, by the processing system 20 of FIG. 4, or by another suitable processing system. It should be appreciated that, although the method 200 is described with reference to field programmable devices, it should be appreciated that the FPDs may be one of a field-programmable gate array, a programmable read-only memory, or a programmable logic device. The method 200 starts at block 202 and continues to block 204.

At block 204, the method 200 includes determining, by a processor, a first workload performance for a first general purpose processor and a first field programmable device for a first processing system. Determining the first workload performance may be based on at least one of a utilization of the first general purpose processor in the first processing system (e.g., a percentage of utilization, a delay, a number of pending tasks, response time, remaining capacity, etc.) and a utilization of the first field programmable device in the first processing system (e.g., a percentage of utilization, a queue time, a number of pending tasks, response time, remaining capacity, etc.) on behalf of the workload being evaluated. According to aspects of the present disclosure, determining the first workload performance includes calculating a first summarized delay for the first general purpose processor and a first summarized queue time for the first group of field programmable devices. The summarization could be the average delay over a general purpose processor, or the medium queue time for the first field programmable device. It should be appreciated that the first general purpose processor may include a plurality or group of general purpose processors, and the first FPD may include a plurality or group of FPDs.

In a non-limiting example, the first processing system can have four FPDs, although any suitable number of FPDs is possible. In an example two of the FPDs are running logic A for encryption, and two FPDs are running logic B for imagine processing. The workload performances for workload 1 can be determined based on workload 1's dependency on the general purpose processors, FPDs with logic A, and FPDs with logic B. For example, a workload dealing with only image processing might only utilize the FPDs running logic B for image processing. A workload dealing with both image processing and encryption might utilize the FPDs running logic A and the FPDs running logic B. The summarization of queue time for workload might have two separate queue time for the first group of FPD and second group of FPD.

In another non-limiting example, FPDs programmed with the same logic can be used by multiple workloads. In the above example, a first workload dealing with both image processing and encryption might utilize both the FPDs running logic A and the FPDs running logic B. A second workload that does not utilize encryption and only utilizes image processing might only utilize the second group of FPDs. To evaluate the deployment of the first workload, the FPDs running logic A and the FPDs running logic B are considered for performance. To evaluate the deployment of the second workload, only the FPDs running logic B are considered for performance.

In another non-limiting example, a virtual server on processing system might have limited access to an FPD. For example, a virtual server on a processing system's utilization of the FPD might be "capped" at 60% or 400 requests per minutes. The performance of a virtual server on a processing system can be evaluated based on the "capped" value. An FPD might be capped at 60% for virtual server A running on a first processing system, and virtual server A might be utilizing 50% of the resources available to it. It can be determined that virtual server A is utilizing 30% of the physical FPD, and another 30% of the FPD is available to process additional workloads. Another FPD capped at 80% for virtual server B running on the second processing system, and virtual server B might be utilizing 50% of the resources available to it. It can also be determined that virtual server B is utilizing 40% of the physical FPD, and another 40% of the FPD is available to process additional work. Even though both virtual server A and virtual server B are utilizing 50% of FPD available to them, based on the normalized FPD utilization, it can be determined that virtual server B is more capable of processing additional workload.

In another non-limiting example following above, the capability of the FPDs used by the first processing system and the second processing system can also be normalized. For example, the FPD used by the first processing system can handle 100 requests per a second, while FPD used by the second processing system can handle 40 requests per second. In the above example where virtual server A has 40% of the FPD available to process additional workload, while virtual server B has 50% of the FPD available to process additional workload. After normalization with the FPD capability, virtual server A can handle 40 requests per second, while virtual server B can handle an additional 20 requests per second. Based on the normalized FPD utilization, it can be determined that virtual server A is more capable of processing additional workload.

In another non-limiting example, the percent utilization of FPDs can be measured using mechanism other than queue time. The available capacity of a FPD can be calculated or estimated based on the "amount of additional work" it can process without causing the average number of queued requests to increase over a threshold. And, the utilization can be calculated based on the available capacity over the total capacity, which can be calculated using the currently utilized capacity plus the available capacity. And, the utilization of multiple FPDs with the same logic can be calculated in a similar way.

At block 206, the method 200 includes determining, by the processor, a second workload performance for a second general purpose processor and a second field programmable device for a second processing system. Determining the second workload performance may be based on at least one of a utilization of the second general purpose processor (e.g., a percentage of utilization, a delay, a number of pending tasks, response time, remaining capacity, etc.) and a utilization of the second field programmable device (e.g., a percentage of utilization, a queue time, a number of pending tasks, response time, remaining capacity, etc.). According to aspects of the present disclosure, determining the second workload performance includes calculating a second delay for the second general purpose processor and a second queue time the second field programmable device.

At decision block 208, the method 200 includes determining whether the first processing system is likely to outperform the second processing system for execution of a workload. According to aspects of the present disclosure, determining whether the first processing system is likely to outperform the second processing system for the workload further comprises comparing a sum of the first delay or other utilization measures and the first queue time or other utilization measures for the first processing system to a sum of the second delay or other comparable utilization measure and the second queue time or other comparable utilization for the second processing system.

If it is determined at decision block 208 that the first processing system is likely to outperform the second processing system for the workload, at block 210, the method 200 includes deploying the workload to the first system. If, however, it is determined at decision block 208 that the first processing system is not likely to outperform the second processing system for the workload, at block 212, the method 200 includes deploying the workload to the second processing system.

In another non-limiting example, the decision block 208 can perform another logic by determining the adverse impact to the existing workload. If it is determined that adding the workload to the first system is likely to cause a worst adverse effect to the existing workload compare to adding the workload to the second system, the method 200 might decide to deploy the workload to the second system. Other logics can be implemented, for example, a combination of benefit and adverse effect described above can be evaluated.

It should be appreciated that the workload may include a container

The method 200 continues to block 214 and ends. Additional processes also may be included, and it should be understood that the processes depicted in FIG. 2 represent illustrations, and that other processes may be added or existing processes may be removed, modified, or rearranged without departing from the scope and spirit of the present disclosure.

Figure 3:
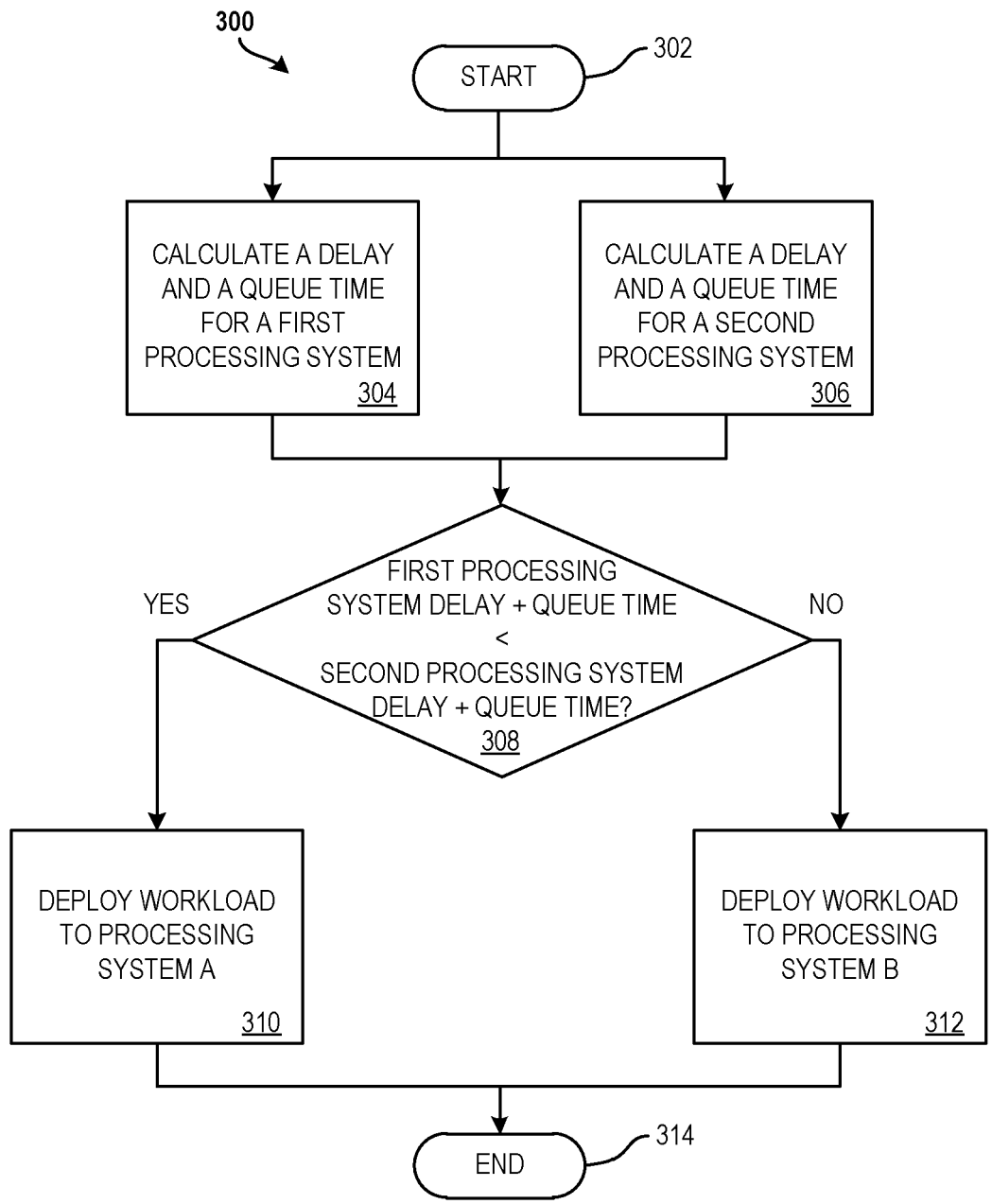
FIG. 3 illustrates a flow diagram of a method for managing workload distribution among processing systems based on field programmable devices according to examples of the present disclosure.

FIG. 3 illustrates a flow diagram of a method 300 for managing workload distribution among processing systems based on field programmable devices according to examples of the present disclosure. The method 300 may be performed, for example, by the processing system 100 and/or the processing system 101 of FIG. 1, by the processing system 20 of FIG. 4, or by another suitable processing system. It should be appreciated that, although the method 300 is described with reference to field programmable devices, it should be appreciated that the FPDs may be one of a field-programmable gate array, a programmable read-only memory, or a programmable logic device. The method 300 starts at block 302 and continues to block 304.

At block 304, the method 300 includes calculating a first delay for a first general purpose processor (e.g., processor 102) and a first queue time a first field programmable device (e.g., FPD 110) of a first processing system (e.g., processing system 100).

At block 306, the method 300 includes calculating a second delay for a second general purpose processor (e.g., processor 103) and a second queue time a second field programmable device (e.g., FPD 111) of a second processing system (e.g., processing system 101).

At decision block 308, the method 300 includes comparing a sum of the first delay and the first queue time for the first processing system to a sum of the second delay and the second queue time for the second processing system. If the sum of the first delay and the first queue time for the first processing system is less than the sum of the second delay and the second queue time for the second processing system, then at block 310 the method 300 includes deploying a workload to the first processing system (e.g., processing system 100). If, however, the sum of the first delay and the first queue time for the first processing system is not less than the sum of the second delay and the second queue time for the second processing system, then at block 310 the method 300 includes deploying a workload to the second processing system (e.g., processing system 101).

The method 300 continues to block 314 and ends. Additional processes also may be included, and it should be understood that the processes depicted in FIG. 2 represent illustrations, and that other processes may be added or existing processes may be removed, modified, or rearranged without departing from the scope and spirit of the present disclosure.

For container relocation decision or virtual server migration, similar technique of calculating and projecting performance of a virtual server or container running on a processing system, and corresponding performance tradeoff and comparison can be done. During a migration, current utilization of workloads running on multiple processing systems can be normalized, and the performance and adverse effect of migrating a virtual server or container to a processing system can be evaluated.

In another non-limiting example, a container on processing system A might be using the general purpose processors, and some FPDs are configured with logic A while other FPDs are configured with logic B. Processing system B might be running workloads using the general purpose processors and FPDs with logic A. It can be determined that processing system B cannot support the container due to the missing FPDs with logic B. Furthermore, it's possible for processing system B to setup FPDs with logic B, and therefore, it can be used for the container.

In yet another non-limiting example, assuming all the utilization has already been normalized using the techniques above, a container on processing system A might be using the general purpose processors running at 40% utilized. Processing system A includes FPDs with logic A running at 30% utilized and logic B running at 50% utilized. This container can move to two processing systems B or C. Processing system B has the general purpose processor running at 20% utilized, FPDs with logic A running at 60% utilized, and FPDs with logic B running at 10% utilized. Processing system C has the general purpose processor running at 40% utilized, FPDs with logic A running at 40% utilized, and FPDs with logic B running at 30% utilized. If the container is moved to processing system B, processing system B then has 40% of the general purpose processor, 10% of FPDs with logic A, and 40% of FPD with logic B available to processing additional work. If the container is moved to processing system C, then there is 20% of the general purpose processor, 30% of FPDs with logic A, and 20% of FPD with logic B available to process additional work. Depending on the implementation, it might be decided to relocate the container to processing system C, because every type of processor has at least 20% capacity available after the relocation while processing system B only has 10% capacity available for FPDs with logic A. Another implementation might consider the overall available capacity, where processing system B has 90% capacity available and processing system C has 70% capacity available, and decided to move the container to processing system B.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for managing workload distribution based on field programmable devices, the method comprising:
   determining, by a processor, a first workload performance for a first general purpose processor and a first field programmable device for a first processing system, wherein determining the first workload performance is based on a first utilization of the first general purpose processor and a first utilization of the first field programmable device in the first processing system, wherein the first utilization of the first field programmable device is calculated based at least in part on an available capacity over a total capacity, wherein the total capacity is calculated based at least in part on a currently utilized capacity plus the available capacity, wherein the available capacity of the first field programmable device for the first processing system is calculated based at least in part on an amount of additional work that the first field programmable device can process without causing an average number of queued requests to increase over a first threshold;
   determining, by the processor, a second workload performance for a second general purpose processor and a second field programmable device for a second processing system;
   determining whether the first processing system is likely to outperform the second processing system for execution of a workload; and
   responsive to determining that the first processing system is likely to outperform the second processing system for the workload, deploying the workload to the first processing system.

2. The computer-implemented method of claim 1, further comprising responsive to determining that the first processing system not likely to outperform the second processing system for the workload, deploying the workload to the second processing system.

3. The computer-implemented method of claim 1, wherein determining the first workload performance comprises calculating a first delay for the first general purpose processor and a first queue time the first field programmable device.

4. The computer-implemented method of claim 3, wherein determining the second workload performance comprises calculating a second delay for the second general purpose processor and a second queue time the second field programmable device.

5. The computer-implemented method of claim 4, wherein determining whether the first processing system is likely to outperform the second processing system further comprises comparing a sum of the first delay and the first queue time for the first processing system to a sum of the second delay and the second queue time for the second processing system.

6. The computer-implemented method of claim 1, wherein determining the second workload performance is based on at least one of a utilization of the second general purpose processor and a utilization of the second field programmable device.

7. The computer-implemented method of claim 1, wherein the first field programmable device is one of a field-programmable gate array, a programmable read-only memory, or a programmable logic device.

8. The computer-implemented method of claim 1, wherein the second field programmable device is one of a field-programmable gate array, a programmable read-only memory, or a programmable logic device.

9. The computer-implemented method of claim 1, further comprising:
   normalizing a capability of the a first field programmable device used by the first processing system and the second field programmable device used by the second processing system.

10. The computer-implemented method of claim 1, wherein the first general purpose processor comprises a first plurality of general purpose processors, wherein the first field programmable device comprises a first plurality of field programmable devices, wherein the second general purpose processor comprises a second plurality of general purpose processors, and wherein the second field programmable device comprises a second plurality of field programmable devices.

11. The computer-implemented method of claim 10, wherein a first field programmable device of the first plurality of field programmable devices is configured to perform a first workload, and wherein a second field programmable device of the first plurality of field programmable devices is configured to perform a second workload.

12. A system for managing workload distribution based on field programmable devices, the system comprising:
   a memory having computer readable instructions; and
   a processing device for executing the computer readable instructions, the computer readable instructions comprising:
      determining a first workload performance for a first general purpose processor and a first field programmable device for a first processing system, wherein determining the first workload performance comprises calculating a first summarized delay for the first general purpose processor and a first summarized queue time for the first field programmable device, wherein the first summarized delay is an average delay for the first general purpose processor, and wherein the first summarized queue time is an average queue time for the first field programmable device;

determining a second workload performance for a second general purpose processor and a second field programmable device for a second processing system;

determining whether the first processing system is likely to outperform the second processing system for execution of a workload; and responsive to determining that the first processing system is likely to outperform the second processing system for the workload, deploying the workload to the first processing system.

13. The system of claim 12, wherein determining the first workload performance comprises calculating a first delay for the first general purpose processor and a first queue time the first field programmable device.

14. The system of claim 13, wherein determining the second workload performance comprises calculating a second delay for the second general purpose processor and a second queue time the second field programmable device.

15. The system of claim 14, wherein determining whether the first processing system is likely to outperform the second processing system further comprises comparing a sum of the first delay and the first queue time for the first processing system to a sum of the second delay and the second queue time for the second processing system.

16. The system of claim 12, wherein determining the second workload performance is based on at least one of a utilization of the second general purpose processor and a utilization of the second field programmable device.

17. The system of claim 12, wherein the first field programmable device is one of a field-programmable gate array, a programmable read-only memory, or a programmable logic device.

18. A computer program product for managing workload distribution based on field programmable devices, the computer program product comprising:

a computer readable storage medium having program instructions embodied therewith, the program instructions executable by a processing device to cause the processing device to:

determine a first workload performance for a first general purpose processor and a first field programmable device for a first processing system, wherein determining the first workload performance is based on a first utilization of the first general purpose processor and a first utilization of the first field programmable device in the first processing system, wherein the first utilization of the first field programmable device is calculated based at least in part on an available capacity over a total capacity, wherein the total capacity is calculated based at least in part on a currently utilized capacity plus the available capacity, wherein the available capacity of the first field programmable device for the first processing system is calculated based at least in part on an amount of additional work that the first field programmable device can process without causing an average number of queued requests to increase over a first threshold;

determine a second workload performance for a second general purpose processor and a second field programmable device for a second processing system;

determine whether the first processing system is likely to outperform the second processing system for execution of a workload; and responsive to determining that the first processing system is likely to outperform the second processing system for the workload, deploy the workload to the first processing system.

* * * * *